United States Patent
Deevers et al.

(10) Patent No.: US 6,962,181 B2
(45) Date of Patent: Nov. 8, 2005

(54) PNEUMATIC TIRE HAVING BUILT-IN SEALANT LAYER AND PREPARATION THEREOF

(75) Inventors: Susan Lynn Deevers, Clinton, OH (US); Raymond Robert DiRossi, Akron, OH (US); George Frank Balogh, North Canton, OH (US); Brian David Holden, Cuyahoga Falls, OH (US); Leonard James Reiter, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 234 days.

(21) Appl. No.: 10/368,259

(22) Filed: Feb. 17, 2003

(65) Prior Publication Data

US 2004/0159386 A1 Aug. 19, 2004

(51) Int. Cl.$^7$ ............................................... B60C 19/12
(52) U.S. Cl. ..................... 152/503; 152/504; 523/166
(58) Field of Search .............................. 152/502–507; 523/166

(56) References Cited

U.S. PATENT DOCUMENTS

| | | | |
|---|---|---|---|
| 3,048,509 A | | 8/1962 | Sweet et al. ................ 154/43.5 |
| 3,628,585 A | * | 12/1971 | Pace ............................ 152/37 |
| 3,866,652 A | * | 2/1975 | Ahmad ........................ 152/317 |
| 4,037,636 A | * | 7/1977 | Hagenbohmer et al. .... 152/504 |
| 4,140,167 A | | 2/1979 | Bohm et al. ................ 152/346 |
| 4,171,237 A | | 10/1979 | Bohm et al. ................ 156/115 |
| 4,228,839 A | | 10/1980 | Bohm et al. ................ 152/347 |
| 4,396,053 A | * | 8/1983 | Davis et al. ................ 152/504 |
| 4,502,520 A | | 3/1985 | Sandstrom .................. 152/330 |
| 4,539,344 A | | 9/1985 | Van Ornum et al. ........ 523/166 |
| 4,895,610 A | | 1/1990 | Egan .......................... 156/115 |
| 5,295,525 A | * | 3/1994 | Sanda, Jr. ................... 152/503 |
| 5,702,111 A | * | 12/1997 | Smith .......................... 277/650 |
| 6,264,732 B1 | * | 7/2001 | Tanaka et al. ................ 106/33 |
| 2004/0194862 A1 | * | 10/2004 | Fukutomi et al. ........... 152/204 |

FOREIGN PATENT DOCUMENTS

| | | | |
|---|---|---|---|
| EP | 135463 | 3/1985 | ........... B60C/21/08 |
| EP | 931815 | 7/1999 | ........... C08L/23/28 |
| GB | 2082191 | 3/1982 | ........... C08L/23/22 |

OTHER PUBLICATIONS

European Search Report.

* cited by examiner

*Primary Examiner*—Geoffrey L. Knable
(74) *Attorney, Agent, or Firm*—Henry C. Young, Jr.

(57) ABSTRACT

This invention relates to a pneumatic tire having a built-in sealant layer and its preparation. The sealant layer precursor is a layer of a butyl rubber based composition which contains an organoperoxide. The butyl rubber of said precursor is a copolymer of isobutylene and isoprene containing from about 0.5 to about 5, alternately less than 1, mole percent isoprene. The precursor composition contains carbon black and/or coal dust and may contain a dispersion of liquid conjugated diene polymer (e.g. liquid cis 1,4-polyisoprene polymer), short fibers and/or hollow glass microspheres. A layer of the sealant precursor is built into the tire between a sulfur vulcanized halobutyl rubber innerliner and conjugated diene-based rubber of the tire carcass. The butyl rubber of the sealant precursor is partially depolymerized by the organoperoxide during the elevated temperature vulcanization of the tire to form the built-in sealant layer. In one aspect of the invention, said uncured butyl rubber sealant precursor layer composition has a storage modulus G' (80° C.) in a range of about 100 to about 400 kPa and said partially depolymerized butyl rubber sealant layer composition has a storage modulus G' (80° C.) in range of about 5 to about 50 kPa.

9 Claims, No Drawings

PNEUMATIC TIRE HAVING BUILT-IN SEALANT LAYER AND PREPARATION THEREOF

FIELD OF THE INVENTION

This invention relates to a pneumatic tire having a built-in sealant layer and its preparation. The sealant layer precursor is a layer of a butyl rubber based composition which contains an organoperoxide. The butyl rubber of said precursor is a copolymer of isobutylene and isoprene containing from about 0.5 to about 5, alternately less than 1, mole percent isoprene. The precursor composition contains carbon black and/or coal dust and may contain a dispersion of liquid conjugated diene polymer (e.g. liquid cis 1,4-polyisoprene polymer), short fibers and/or hollow glass microspheres. A layer of the sealant precursor is built into the tire between a sulfur vulcanized halobutyl rubber innerliner and conjugated diene-based rubber of the tire carcass. The butyl rubber of the sealant precursor is partially depolymerized by the organoperoxide during the elevated temperature vulcanization of the tire to form the built-in sealant layer. In one aspect of the invention, said uncured butyl rubber sealant precursor layer composition has a storage modulus G'(80° C.) in a range of about 100 to about 400 kPa and said partially depolymerized butyl rubber sealant layer composition has a storage modulus G' (80° C.) in range of about 5 to about 50 kPa.

BACKGROUND OF THE INVENTION

Various pneumatic tires have been proposed which contain a built-in sealant layer based upon a depolymerized butyl rubber layer.

For example, in U.S. Pat. No. 4,895,610 it is proposed to build a layer of butyl rubber-based composition into a tire which contains a polyisobutylene polymer and an organoperoxide, following which under a conditions of elevated temperature used to cure the tire, a major portion of the butyl rubber is presented as being depolymerized to form a tacky material which has puncture sealant properties.

U.S. Pat. Nos. 4,228,839, 4,171,237 and 4,140,167 also relate to a sealant layer in a tire formed by depolymerizing and crosslinking a butyl rubber based rubber composition, particularly by irradiation treatment.

Historically, other patent publications relate to tire constructions, sealant compositions and methods wherein a sealant material is positioned between calendered rubber layers. For example, see U.S. Pat. Nos. 3,048,509 and said 4,228,839.

Other methods, sealants and tire constructions have been suggested for puncture sealant pneumatic tires which relate to use of fluid puncture coatings in which the puncture sealant flows into the puncture hole. However, it is considered herein that such liquid puncture sealants may flow excessively under heated conditions and thereby may tend to cause the tire to become out of balance. Also, it is considered herein that many times such a liquid sealant coating would not likely be entirely operable or effective over a wide temperature range extending from summer to winter conditions. More complicated structures which involve encasing a liquid sealant material in a vulcanized rubber material are usually expensive to manufacture and can also create balance and suspension problems due to the additional weight required in the tire. Further, puncture sealing tires have been proposed wherein a layer of degraded rubber which is tacky or gummy (of low viscosity) is assembled into the unvulcanized tire. This method of construction is usually only reasonably possible when, for example, the degraded layer of rubber is laminated with another non-degraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more non-degraded rubber layers it is capable of retaining its structural integrity during the vulcanization operation wherein high pressures are applied to the tire which would displace the degraded rubber layer from its desired location if not laminated. Such a lamination procedure adds greatly to the cost of building a tire. Thus, such a lamination procedure has not been widely accepted on a commercial basis for building puncture sealing pneumatic tires. There has been a continuing desire for a pneumatic tire having an effective puncture sealing feature and for a simple and practical method of preparing such a tire.

This invention provides a method for building a tire with puncture sealing features by degrading (depolymerizing) a built-in rubber layer (butyl rubber based rubber composition). The butyl rubber may contain a dispersion therein of said filler as carbon black in combination with said liquid conjugated diene polymer such as, for example, a liquid cis 1,4-polyisoprene polymer and/or a dispersion therein of short fibers and/or said hollow glass microspheres, wherein such degrading of the butyl rubber occurs after it is built into the tire and during the vulcanization of the tire. Therefore, during the initial tire building procedure the butyl rubber-based, sealant precursor, layer (which will become the sealant layer after the tire is cured) can be built into the tire in a manner similar to other rubber layers.

In the description of this invention, the term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention, a pneumatic tire having a built-in puncture sealing layer is provided wherein said puncture sealing layer contains an at least partially organoperoxide-depolymerized butyl rubber-based sealant layer positioned between a sulfur vulcanized halobutyl rubber tire innerliner and a sulfur vulcanized diene-based vulcanized conjugated diene-based tire carcass, wherein said sealant layer is a polymeric composition having a storage modulus (G') in a range of from about 5 to about 50, alternately about 5 to about 30, kPa and is comprised of, based upon parts by weight per 100 parts by weight of said partially depolymerized butyl rubber:

(A) a partially organoperoxide-depolymerized butyl rubber as a copolymer of isobutylene and isoprene, wherein said copolymer prior to such depolymerization contains from about 0.5 to about 5, alternately about 0.5 to about 0.9, percent units derived from isoprene, and correspondingly from about 95 to about 99.5, alternately about 99.1 to about 99.5, weight percent units derived from isobutylene, and, based upon parts by weight per 100 parts by weight partially depolymerized butyl rubber (phr) of:

(B) particulate filler comprised of about 5 to about 90 phr of at least one of rubber reinforcing carbon black and coal dust, and mixtures thereof, and, optionally:

(1) from zero to 6, alternately about 0.5 to about 5, phr of short fibers, and/or (2) from zero to about 20, alternately from about 5 to about 15, phr of hollow glass microspheres;

(C) from zero to about 20, alternately about 4 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent;

(D) from zero to about 10, alternately about 1 to about 10, and alternately about 2 to about 4, phr of liquid conjugated diene-based polymer having a weight average molecular weight of less than 80,000 and preferably in a range of from 35,000 to about 60,000, provided however, where said particulate filler is exclusively rubber reinforcing carbon black, said partially depolymerized butyl rubber preferably contains at least 1 phr of said liquid diene-based polymer.

In one aspect, where said reinforcing filler is exclusively said rubber reinforcing carbon black, said butyl rubber composition contains said liquid diene-based polymer.

It is further envisioned that where said particulate filler is comprised of said coal dust, optionally with at least one of said rubber reinforcing carbon black, said hollow glass microspheres and/or said short fibers, said butyl rubber composition optionally contains said liquid diene-based polymer.

It is additionally envisioned that said particulate filler is said coal dust, optionally with at least one of said hollow glass microspheres and/or short fibers and said butyl rubber composition optionally contains said liquid diene-based polymer.

The various rubber processing oils are well known to those having skill in such art. For this invention, a rubber processing oil having a low aromaticity content is preferred, namely a rubber processing oil having an aromaticity content of less than about 15 weight percent. Such a preferred rubber processing oil may be composed of, for example, about 35 to about 45 weight percent naphthenic content, about 45 to about 55 weight percent paraffinic content and an aromatic content of less than about 15 weight percent (e.g. from about 10 to about 14 weight percent). It is considered herein that a representative of such preferred rubber processing oil is Flexon 641™ from the ExxonMobil company.

In practice, such short fibers may be selected from, for example, cotton fibers and from synthetic fibers selected from rayon, aramid, nylon and polyester fibers, and their mixtures. In practice, such cotton short fibers may have an average length, for example, in a range of up to about 200 microns (e.g. an average length of about 150 microns) and the synthetic (e.g. the polyester and nylon fibers) may have an average length, for example, of up to a maximum of about 2,500 microns. The short fibers are considered herein to promote adjustment of a G' property of the sealant composition as well as, in relatively low concentrations, not significantly interfering with the processing of the sealant precursor composition and enhancing the efficiency of the resultant built-in sealant layer and its puncture sealing ability.

Representative of the hollow glass microspheres are, for example, Scotchlite Glass Bubbles™ (S60/10000 series), having an average spherical diameter of about 30 microns, from the 3M Company. The hollow glass microspheres are considered herein to promote adjustment of a G' property of the sealant composition as well as enhancing the puncture sealing efficiency and capability of the built-in sealant and, in relatively low concentrations, not significantly adversely affecting the processing of the sealant precursor composition.

Coal dust is carbonaceous dust from naturally occurring coal. It might sometimes be referred to as being coal fines. Coal dust is of significantly greater size than rubber reinforcing carbon black, is not rubber reinforcing in the sense of rubber reinforcing carbon black, represents a significantly lower cost filler than rubber reinforcing carbon black and, significantly, can be used in greater quantities (concentration) in the rubber composition without significantly adversely affecting the processing of the sealant precursor composition, yet being beneficial to aid in the efficiency of the puncture sealing ability of the resultant built-in sealant layer. Further, the coal dust is considered herein useful in promoting adjustment of the G' property of the sealant.

In practice, a pneumatic tire having a puncture sealing ability comprised of an assembly of components comprised of an outer circumferential sulfur curable rubber tread, at least one sulfur curable rubber carcass ply supporting said tread and an inner sulfur curable halobutyl rubber tire innerliner layer, is prepared by:

(A) positioning a layer of an uncured butyl rubber-based rubber composition, exclusive of sulfur curative, as a sealant layer precursor between said innerliner and rubber carcass, wherein said butyl rubber based composition has a storage modulus G' (80° C.) in a range of from about 100 to about 400, alternately and more preferably, about 140 to about 270, kPa, wherein said sealant precursor butyl rubber composition is comprised of, based upon parts by weight per 100 parts of butyl rubber (phr):

(1) 100 phr of butyl rubber as a copolymer of isobutylene and isoprene which contains about 0.5 to about 5, alternately and preferably from about 0.5 to about 0.9, mole percent units derived from isoprene and, correspondingly about 95 to about 99.5, alternately about 99.5 to about 99.9, mole percent derived from isobutylene, and, based upon parts by weight per 100 parts of said butyl rubber (phr);

(2) particulate filler comprised of about 5 to about 90 phr of at least one of rubber reinforcing carbon black and coal dust, and mixtures thereof, and optionally (a) from zero to about 6, alternately about 0.5 to about 5, phr of short fibers, and/or (b) from zero to about 20, alternately from about 5 to about 15, phr of hollow glass microspheres;

(3) from zero to about 20, alternately about 4 to about 15, phr of rubber processing oil, preferably a rubber processing oil having a maximum aromatic content of about 15 weight percent, preferably a naphthenic content in a range of from about 35 to about 45 weight percent and preferably a paraffinic content in a range of about 45 to about 55 weight percent;

(4) from zero to about 10, alternately about 1 to about 10, and alternately about 2 to about 4, phr of liquid conjugated diene-based polymer having a weight average molecular weight of less than 80,000 and preferably in a range of from 35,000 to about 60,000, provided however, where said particulate filler is exclusively rubber reinforcing carbon black, the content of said liquid diene-based polymer is at least 1 phr; and (5) about 0.5 to about 10 phr of active organoperoxide compound; and, (B) vulcanizing said tire assembly in a suitable mold at a temperature in a range of from about 150° C. to about 175° C. for a sufficient period of time to partially depolymerize said butyl rubber and thereby form a built-in sealant layer having a storage modulus property G' (80° C.) in a range of from about 5 to about 50, alternately about 5 to about 30, kPa.

A significant aspect of this invention is the partial depolymerization of the butyl rubber to reduce its storage modulus G' (80° C.) from a value in a range of from about 100 to about 400, alternately from 140 to 270, kPa to a value in a range of from about 5 to about 50 kPa.

This is considered herein to be significant because said butyl rubber sealant precursor having the G' in a range of from about 100 to about 400, alternately from 140 to 270, kPa is normally a rubber composition which is conventionally processable as a rubber composition which can be suitably built as a rubber layer into a tire. Furthermore, this is considered herein to be significant because said built-in sealant layer as the depolymerized butyl rubber composition, obtained after the curing of the tire assembly at an elevated temperature, having a G' in a range of from 5 to about 30 kPa, is considered to provide a suitable built-in sealant layer for the pneumatic tire.

In the practice of this invention, the storage modulus G' is a dynamic property well known to those having skill in such art and is determined by an RPA analytical instrument as an Alpha Technologies (formerly Monsanto) RPA™ Series 2000 (Rubber Processing Apparatus) operated at 80° C., one Hertz and a strain sweep of from one to 50 percent strain from which the 5 percent strain is referenced for the G' value for the butyl rubber based sealant precursor. The butyl rubber based sealant precursor is heated to 170° C. for 12 minutes, followed by a second 80° C., one Hertz strain sweep of from 1 to 50 percent by the RPA Series 2000 instrument from which the 5 percent strain is used for determination of the reacted G' value of the sealant composition of the depolymerized butyl rubber.

In practice, to some extent, isobutylene is produced as a byproduct of the organoperoxide generated partial depolymerization of the isobutylene/isoprene copolymer (the butyl rubber).

In one aspect, it is preferred that the units derived from isoprene of the butyl rubber isobutylene/isoprene copolymer is less than three mole percent and more preferably in a range of from 0.5 to 1.0 mole percent of the copolymer. Such butyl rubber preferably has a Mooney ML (1+8 at 125° C.) viscosity value in a range of from about 20 to about 50, preferably from about 30 to about 40.

The liquid conjugated diene-based liquid polymer may be, for example, a liquid cis 1,4-polyisoprene polymer and/or liquid cis 1,4-polybutadiene polymer, preferably a liquid cis 1,4-polyisoprene polymer. It is to be appreciated that such liquid polymers for the butyl rubber precursor composition are therefore polymers which contain olefinic unsaturation and therefore are not intended to include polyisobutylene which does not contain olefinic unsaturation.

A commercial liquid cis 1,4-polyisoprene polymer may be, for example, LIR 50™ from the Kuraray Company of Osaki, Japan. A liquid cis 1,4-polybutadiene polymer (absorbed on a particulate filler) may be, for example, Karasol PS-01™ from the Drobny Polymer Association.

It is considered herein that the liquid polyisoprene polymer in the butyl rubber acts to aid in regulating the storage modulus G' of the partially depolymerized butyl rubber. For example, addition of the liquid polyisoprene polymer has been observed to provide the partially depolymerized butyl rubber composition with a somewhat increased loss modulus G' which may be desirable for some applications.

Upon sulfur vulcanization of the tire assembly under conditions of elevated temperature, a major portion of the uncured butyl rubber composition is considered herein to be depolymerized in the presence of the organoperoxide compound to form a tacky material, which may contain the dispersion therein of said liquid polyisoprene polymer and/or dispersion of short fibers, and which has puncture sealant properties.

For the rubber reinforcing carbon black, as a filler component for the sealant layer, and sealant layer precursor, of this invention, various particulate rubber reinforcing carbon blacks are, for example, carbon black referenced in *The Vanderbilt Rubber Handbook*, 1978, Pages 408 through 417, which are characterized by iodine adsorption (ASTM D1510) and dibutylphthalate absorption (ASTM D 2414) values which are prepared by deposition from a vapor phase at very high temperatures as a result of thermal decomposition of hydrocarbons as described on page 409, rather than a carbonization of organic substances. According to page 409, such carbon black may have an Iodine adsorption value ranging from 20 to 270 mg/g and a dibutylphthalate absorption value ranging from 60 to 180 cc/100 gms. Exemplification of such carbon blacks are represented according to their ASTM designated numbers on Page 417. According to Page 417, such carbon black is composed of aggregates of elemental carbon particles of colloidal dimensions which have a high surface area.

For the coal dust, as a filler component for the sealant layer, and sealant layer precursor, of this invention, coal dust is a naturally occurring particulate carbonaceous filler which differs significantly from the aforesaid rubber reinforcing synthesized carbon black aggregates. In particular, coal dust may be described as particles of finely ground coal which may sometimes be referred to as coal fines.

In practice, said liquid polyisoprene polymer may have a viscosity at 23° C. in a range of about 20 to about 40 cps, and a cis 1,4-content in a range of about 90 to about 99 percent, a trans 1,4-content in a range of about zero to about 10 percent, with the remainder of its microstructure being primarily of a vinyl 1,2-structure; homogeneously dispersed in said uncured butyl rubber.

In practice, said tire innerliner halobutyl layer is a sulfur curative-containing halobutyl rubber composition of a halobutyl rubber such as for example chlorobutyl rubber or bromobutyl rubber.

Such tire halobutyl rubber based innerliner layer may also contain one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of said halobutyl rubbers and said diene based elastomers.

In practice, the physical nature of the butyl rubber composition sealant precursor layer is that, as a butyl rubber based rubber composition, its viscosity is sufficient to permit easy handling and processing during the standard steps in the construction of an unvulcanized tire and during the vulcanization (curing) operation: that is, the polymer composition layer has enough uncured strength (modulus) and sufficient viscosity to retain its shape during building and enough building tack to stick to adjacent layers during building and enough strength to substantially retain its shape during the application of the high pressure and elevated temperature in a suitable mold during vulcanization.

As the tire is vulcanized together with the butyl rubber based rubber composition layer (the sealant layer precursor)

sandwiched between the tire carcass ply(s) and the tire's rubber innerliner, the butyl rubber of the butyl rubber based composition layer which is to become the sealant layer, becomes partially depolymerized. In effect, the butyl rubber in the butyl rubber based composition sealant layer is depolymerized to a low viscosity to form a tacky material which has puncture sealing properties. Thus, the butyl rubber composition layer is transformed into a puncture sealant layer during the curing of the tire. This partial depolymerization of the butyl rubber composition layer is effectuated by the presence of one or more organoperoxides contained in the butyl rubber composition which causes the butyl rubber depolymerization by breaking the molecular chains, due to the highly unsaturated structure of the butyl rubber.

As previously related, the butyl rubber for the sealant layer precursor for this application may be prepared, for example, by copolymerizing isobutylene with small amounts of isoprene. Generally, the butyl rubber contains from about 0.5 to about five percent repeat units derived from isoprene and from about 95 to 99.5 percent repeat units derived from isobutylene by weight. The butyl rubber that can be employed in the polymer composition of the tires of this invention may typically have a number average molecular weight, for example, in the range of 200,000 to 500,000 and alternately in the range of about 300,000 to about 400,000. Such butyl rubber and its preparation is well known to those having skill in such art.

In practice, the butyl rubber composition as the sealant precursor contains a sufficient amount of organoperoxide to cause the butyl rubber to partially depolymerize, usually in a range of from about 0.5 to about 10 phr of the active organoperoxide depending somewhat upon the time and temperature of the tire curing operation and the degree of depolymerization desired.

Various organoperoxides may be used in the polymer (sealant) composition layer. Preferably organoperoxides are desired which become activate (e.g. generate peroxide free radicals) at high temperatures, that is, above about 100° C. Such organoperoxides are referred to therein as active peroxides. Examples of such organoperoxides which are considered herein as being active organoperoxides are, for example, tertbutyl perbenzoate and dialkyl peroxides with the same or different radicals, such as dialkylbenzene peroxides and alkyl pre-esters. Preferably the active organoperoxide will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such active organoperoxides are, for example, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy)hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy)hexane.

Such active organoperoxides may be added to the polymer composition layer in pure form (100 percent active peroxide) or on an inert, free-flowing mineral carrier, such as, for example, calcium carbonate. The organoperoxide on a mineral carrier is preferred for storing the peroxide and handling and processing safety. Such carrier composition containing from about 35 to 60 weight percent active ingredient (peroxide) can be employed very successfully. For example, 40 percent by weight dicumylperoxide on an inert carrier may be employed in the butyl rubber composition sealant layer. Usually, dicumylperoxide is a preferred active organoperoxide.

The various components of the sealant layer can be mixed together using any convenient rubber mixing equipment, particularly an internal rubber mixer. The rubber composition used in the sealant layer typically has sufficient viscosity and unvulcanized tack to enable its incorporation into an unvulcanized tire without departing from standard, long standing tire building techniques and without the use of complicated, expensive tire building equipment.

In the method of this invention, the butyl rubber based rubber composition can be formed into a strip of unvulcanized rubber, by using conventional equipment such as a calender, extruder, or any combination thereof, that is assembled into the tire. In building the tires of this invention a rubber innerliner of a butyl rubber based (e.g. bromobutyl rubber) rubber composition is first applied to a building drum and then the strip of butyl polymer sealant precursor layer is applied to the layer of innerliner. The remainder of the tire component assembly, including a rubber tire carcass cord reinforced ply being applied over said butyl rubber sealant precursor strip. The butyl rubber based sealant precursor layer is thereby assembled into the unvulcanized tire assembly of components between an innerliner layer and tire carcass.

The strip of unvulcanized butyl rubber composition employed as in the sealant composition layer should extend from one shoulder of the tire to the other, in other words, it should cover the crown area or region of the tire. The thickness of the sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle. The tires of this invention can be cured over a wide temperature range. For example, passenger tires might be cured at a temperature ranging from about 130° C. to about 170° C. and truck tires might be cured at a temperature ranging from about 150° C. to about 180° C. Thus, a cure temperature may range, for example, from about 130° C. to about 180° C. and for a period of time (e.g. from about 7 to about 35 minutes or more depending somewhat upon the size of the tire and the degree of desired depolymerization of the butyl rubber) and sufficient to at least partially depolymerize said sealant precursor layer to a storage modulus (G') property in a range of from 5 to about 50 kPa which may also depend upon the aforesaid choice of curing temperature. In practice, a period of time used to vulcanize the tires, in a suitable mold, may therefore, for example, have a duration of about 10 to 14 minutes for a passenger tire and for about 25 to about 35 minutes for a truck tire.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls. The sealant layer is disposed between said supporting carcass and said innerliner. The outer circumferential tread is adapted to be ground contacting when the tire is in use.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

EXAMPLE I

A tubeless pneumatic steel belted rubber tire of the type P225/60/R16 passenger tire is prepared by first applying a standard butyl rubber innerliner layer (e.g. bromobutyl rubber composition) to a standard building drum. Then a layer of butyl rubber composition having a thickness of about 0.3 inches (0.76 cm) is applied to the innerliner layer on the building drum as butyl rubber based sealant precursor rubber layer which is the precursor to the becoming the built-in sealant layer, covered by the innerliner rubber layer, by the partial depolymerization of its butyl rubber component by the included organoperoxide ingredient during the vulcanization of the tire. The butyl rubber (sealant precursor) layer is composed of the components illustrated in the following Table 1 based on parts by weight per 100 parts of the butyl rubber, or phr.

TABLE 1

| Material | Phr |
| --- | --- |
| Butyl rubber[1] | 100 |
| Liquid polyisoprene[2] | 2.5 |
| Carbon black[3] | 23 |
| Organo peroxide (60 percent active)[4] | 5.4 |
| Fibers[5] | 3 |
| Rubber process oil[6] | 4 |

[1]Butyl rubber obtained as Exxon 065(tm) from the ExxonMobil Company
[2]Liquid polyisoprene obtained as LIR 50(tm) from the Kuraray Company
[3]N660, an ASTM designation
[4]Composite of dicumyl peroxide on a mineral carrier in a 60/40 weight ratio and reported in Table 1 as the composite.
[5]Short fibers as Akroflock CDV-2 0220 (tm) from the International Fiber Corporation as cotton fibers reportedly having an average length of about 150 microns.
[6]Rubber processing oil as Flexon 641 ™ from the Exxon Mobil Company reportedly as a naphthenic, paraffinic rubber processing oil having a maximum aromatic content of less than 15 weight percent.

The tread portion, side-walls, beads, and supporting carcass are then assembled into the tire using conventional techniques utilized in the manufacture of steel belted radial tires to form a green, unvulcanized with the built-in sealant precursor layer. The resulting tire is cured in a suitable tire mold at temperature of about 150° C. for about 30 minutes to form a tire with a built-in sealant layer having a thickness of about 0.15 inches (about 0.37 cm) formed by a partial depolymerization of the butyl rubber component by the organo peroxide of the sealant precursor layer at the elevated tire cure temperature.

The tire was mounted on a metal rim and inflated to a suitable inflation pressure. The tire was punctured by driving a combination of nails of various diameters, namely a combination of No. 8, box nails, No. 12 box nails and No. 20 common nails, into the tread and extending through the built-in sealant layer onto the air pressured cavity of the inflated tire. The punctured inflated tire was run under a load of 90 percent of the rated load of the tire against a dynamometer at suitable vehicular speeds of up to 90 kilometers per hour. It was observed that the built-in sealant layer satisfactorily sealed the punctured tire from loss of air from within its air inflated cavity with only a minimal drop in air pressure over a suitable period of time.

The tire test procedure is more fully described as follows. The cued tire containing the built-in, encapsulated sealant layer is tested for sealing efficiency in the following manner. A minimum of two tires per test is required. The tire is mounted on a metal rim and inflated to a test inflation pressure (size dependant). The tire is mounted against a 67 inch (164 cm) diameter road wheel dynamometer which has loaded radius or pressure monitoring equipment attached. This equipment can detect minor changes in inflation pressure and corresponding changes in loaded radius resulting from a pressure drop. It has the capability of stopping the test wheel whenever pre-determined set points are reached. A load equal to 90 percent of maximum load is applied and the tire broken in for 160 Km at 90 Km/h. Following break in, the inflation is reset to the test inflation. The tire is then punctured using 24 nails (eight each of three nail sizes) around its circumference with nail punctures being applied to major groove areas nearest the center of the tread and adjacent to the tire's shoulder rib.

Inflation pressure is reset to the test inflation immediately after nail punctures are completed.

Nail-Removed Test

Remove the 12 nails (4 each of the three sizes) and determine if (hot) loaded radius drops below radius limit set point or inflation pressure drops 60 kPa from cold set point. Plug leaking hole(s) and allow the tire to cool to ambient temperature, re-inflate the tire to test inflation and continue the test.

Nail-Retained Test

Run tire on dynamometer at 90 km/h with 12 nails in place and interrupt the test if (hot) loaded radius drops below radius limit set point or if inflation pressure (hot) drops 60 kPa from cold set point. Plug any leaking hole(s) and allow tires to cool to ambient temperature and re-inflate the tire to test inflation and continue to test. Inspect the tire every eight hours for structural damage and stop test if said condition is found. Stop and finish the test at 16,000 km (178 hr).

Determination of Test Success

Each puncturing object retained or removed is considered a separate test. Sealant test success occurs if the tire loaded radius remains above the radius limit set point or if the tire inflation pressure remains equal to or greater than the test inflation less 60 kPa throughout the test. The sealant tire is graded upon its ability to successfully seal punctures for both nail-removed and nail-retained tests. A sealing efficiency grade of greater than 70 percent for all punctures is considered a successful test.

EXAMPLE II

This Example is presented to illustrate the effect of concentration of an activated organoperoxide as dicumyl peroxide in a butyl rubber-containing rubber composition upon the G' value of partially depolymerized butyl rubber caused by the presence of the dicumyl peroxide.

The rubber composition for this Example is composed of butyl rubber which contains rubber reinforcing carbon black as a particulate filler.

While the rubber composition does not contain coal dust or micro hollow glass beads and does not contain a liquid diene polymer, it is considered herein that this Example is significant to illustrate the effect of concentration of the dicumyl peroxide upon a degree of partial depolymerization of the butyl rubber contained in the composition as indicated by its resultant G' value.

Samples of butyl rubber based sealant were prepared and referred to herein as Samples A through E. Samples A through E contained varying amounts of dicumyl peroxide, as an active organoperoxide.

The basic ingredients for the Samples are illustrated in the following Table 2.

TABLE 2

| Material | Phr |
|---|---|
| Butyl rubber[1] | 100 |
| Carbon black[2] | 23 |
| Dicumyl peroxide (60 percent active)[3] | Variable |
| Rubber process oil[4] | 6.5 |

[1]Butyl rubber obtained as Exxon 065 ™ from the ExxonMobil company
[2]N660, an ASTM designation
[3]Composite of dicumyl peroxide on a mineral carrier in a 60/40 weight ratio and reported in Table 1 as the composite.
[4]Rubber processing oil as Flexon 641 ™ from the Exxon Mobil Company.

For the respective Samples, the dicumuyl peroxide was added as shown in the following Table 3 for the Samples A through E in terms of phr, namely parts by weight per 100 parts by weight of the butyl rubber.

TABLE 3

| Material | A | B | C | D | E |
|---|---|---|---|---|---|
| Dicumyl peroxide | 5.4 | 4.58 | 3.75 | 2.92 | 2.08 |

The Samples were tested by an RPA Series 2000 instrument and the storage modulus G' (80° C. and 5 percent strain) reported for the Samples before and after heating to a temperature of about 170° C. for about 12 minutes to activate the dicumyl peroxide, with the results shown in the following Table 4 for the Samples A through E, reported in units of kPa for the G' values. The G' values are reported for the rubber compositions where the dicumyl peroxide was activated as above (heated to 170° C. for 12 minutes) and where the dicumyl peroxide was not activated.

TABLE 4

|  | A | B | C | D | E |
|---|---|---|---|---|---|
| G', unactivated peroxide | 170 | 170 | 171 | 178 | 178 |
| G', activated peroxide | 12 | 16 | 20 | 31 | 52 |

From Table 4 it can be seen that as the concentration of the peroxide is increased only little effect is observed on the reported G' of the Samples where the organoperoxide was not activated.

From Table 4, for the Samples A through E, in which the organoperoxide has been activiated, it can be seen that as the concentration of the active peroxide is decreased, the resultant G' for the Samples is observed to correspondingly increase from a value of 12 kPa to 52 kPa. The adjustment of the level of active peroxide is considered herein to be significant because it has been observed that at a G' of greater than 30 kPa, which may be achieved by using a decreased active peroxide content, the nail sealing ability of the sealant diminishes whereas in using a reduced active peroxide content, formation of isobutylene volatiles is reduced which may be desirable where reduced isobutylene volatiles is desired.

EXAMPLE III

Samples of butyl rubber based sealant were prepared and referred to herein as Samples F through I which contained varying amounts of liquid polyisoprene.

The basic ingredients for the Samples are illustrated in the following Table 5.

TABLE 5

| Material | Phr |
|---|---|
| Butyl rubber[1] | 100 |
| Liquid polyisoprene[2] | Variable |
| Carbon black[3] | 28 |
| Dicumyl peroxide (60 percent active)[4] | 9.6 |
| Rubber process oil[5] | 4.0 |

[1]Butyl rubber obtained as Bayer Butyl 100 ™ from the Bayer Company
[2]Liquid polyisoprene obtained as LIR 50 ™ from the Kuraray Company
[3]N660, an ASTM designation
[4]Composite of dicumyl peroxide on a mineral carrier in a 60/40 weight ratio and reported in Table 1 as the composite.
[5]Rubber processing oil as Flexon 641 ™ from the Exxon Mobil Company.

For the respective Samples, the liquid polyisoprene was added as shown in the following Table 6 for the Samples F through I in terms of phr, or parts by weight per 100 parts by weight of the butyl rubber.

TABLE 6

| Material | F | G | H | I |
|---|---|---|---|---|
| Liquid polyisoprene | 0 | 1.5 | 3.5 | 4.5 |

The Samples were tested by an RPA Series 2000 instrument and the storage modulus G' (80° C. and 5 percent strain) reported for the Samples before and after heating to a temperature of about 170° C. for about 12 minutes to activate the dicumyl peroxide, with the results shown in the following Table 7 for the Samples F through I, reported in units of kPa for the G' values, where the dicumyl peroxide was activated as indicated above (heated to 170° C. for 12 minutes) and where the dicumyl peroxide was not activated.

TABLE 7

|  | E | G | H | I |
|---|---|---|---|---|
| G', unactivated peroxide | 213.5 | 196.5 | 195.5 | 196.6 |
| G', activated peroxide | 7.5 | 19 | 27.7 | 42 |

From Table 7 it can be seen that addition of the liquid polyisoprene had only little effect on the reported G' of the Samples where the organoperoxide was not activated.

However, it can also be seen from Table 7, where the organoperoxide was activated, the loading of the addition of the liquid polyisoprene had a significant effect upon the G' of the Samples. In particular, as the loading of the liquid polyisoprene increased, the G' increased from a value of 7.5 kPa with zero addition of the liquid polyisoprene to a range of from 19 to 42 kPa for additions of the liquid polyisoprene ranging from 1.5 to 4.5 phr. This is considered herein to be significant because it shows that addition of the liquid polyisoprene (hence unsaturation), can be used to regulate the G' of the sealant (with the reacted organoperoxide) which also improves the process behavior (mixing, milling and calendering operations) of the sealant precursor which contains the unactivated organoperoxide.

EXAMPLE IV

Samples of butyl rubber based sealant were prepared and referred to herein as Samples J through N which contained varying amounts of coal dust.

The basic ingredients for the Samples are illustrated in the following Table 8.

TABLE 8

| Material | Phr |
|---|---|
| Butyl rubber[1] | 100 |
| Coal dust[2] | Variable |
| Carbon black[3] | 28 |
| Dicumyl peroxide (60 percent active)[4] | 9.6 |
| Rubber process oil[5] | Variable |

[1]Butyl rubber obtained as Bayer Butyl 100 ™ from the Bayer Company
[2]Coal dust obtained as coal fines
[3]N660, an ASTM designation
[4]Composite of dicumyl peroxide on a mineral carrier in a 60/40 weight ratio and reported in Table 1 as the composite.
[5]Rubber processing oil as Flexon 641 ™ from the Exxon Mobil Company.

For the respective Samples, the coal dust, rubber reinforcing carbon black and rubber processing oil were added as shown in the following Table 9 for the Samples J through N in terms of phr, or parts by weight per 100 parts by weight of the butyl rubber.

TABLE 9

| Material | J | K | L | M | N |
|---|---|---|---|---|---|
| Coal dust | 0 | 50 | 60 | 70 | 50 |
| Carbon black | 23 | 0 | 0 | 0 | 0 |
| Processing oil | 6.5 | 15 | 15 | 15 | 7.5 |

The Samples were tested by an RPA Series 2000 instrument and the storage modulus G' (80° C. and 5 percent strain) reported for the Samples before (unactivated peroxide) and after (activated peroxide) heating to a temperature of about 170° C. for about 12 minutes to activate the dicumyl peroxide, with the results shown in the following Table 10 for the Samples J through N, reported in units of kPa for the G' values.

TABLE 10

|  | J | K | L | M | N |
|---|---|---|---|---|---|
| G', unactivated peroxide | 170 | 198 | 224 | 259 | 261 |
| G', activated peroxide | 12 | 4 | 7 | 10 | 6 |

From Table 10 it can be seen that addition of the coal dust has a significant effect on the reported G' of the respective Samples where the organoperoxide was unactivated.

However, it can also be seen from Table 10 that the addition of the coal dust had a relatively minor effect upon the G' of the respective Samples where the organoperoxide was activated (170° C). As the loading of the coal dust increased, the G' of the respective Samples which included the activated organoperoxide increased from a value of 4 to 10 kPa for additions of coal dust addition ranging from 50 to 70 phr. This is considered herein to be significant because it shows that much higher loadings of the coal dust may be tolerated to achieve a increased G' value than the rubber reinforcing carbon black in the sealant precursor composition which contains the unactivated peroxide, while achieving relatively equivalent G' values for the sealant composition which contains the activated organoperoxide.

EXAMPLE V

Samples of butyl rubber based sealant were prepared and referred to herein as Samples O through S which contained varying amounts of hollow glass microspheres.

The basic ingredients for the Samples are illustrated in the following Table 11.

TABLE 11

| Material | Phr |
|---|---|
| Butyl rubber[1] | 100 |
| Hollow glass microspheres[2] | Variable |
| Carbon black[3] | 23 |
| Dicumyl peroxide (60 percent active)[4] | 4.5 |
| Rubber process oil[5] | 6.5 |

[1]Butyl rubber obtained as Bayer Butyl 100 ™ from the Bayer Company
[2]Hollow glass microspheres obtained as Scotchlite S60/10000 ™ from the 3M Company having an average diameter of about 30 microns, a specific gravity of about 0.6 g/cc.
[3]N660, an ASTM designation
[4]Composite of dicumyl peroxide on a mineral carrier in a 60/40 weight ratio and reported in Table 1 as the composite.
[5]Rubber processing oil as Flexon 641 ™ from the Exxon Mobil Company.

For the respective Samples, the hollow glass microspheres were added as shown in the following Table 12 for the Samples O through S in terms of phr, or parts by weight per 100 parts by weight of the butyl rubber.

TABLE 12

| Material | O | P | Q | R | S |
|---|---|---|---|---|---|
| Glass microspheres | 0 | 4 | 8 | 12 | 20 |

The Samples were tested by an RPA Series 2000 instrument and the storage modulus G' (80° C. and 5 percent strain) reported for the Samples before (unactivated peroxide) and after (activated peroxide) heating to a temperature of about 170° C. for about 12 minutes to activate the dicumyl peroxide, with the results shown in the following Table 13 for the Samples O through S, reported in units of kPa for the G' values.

TABLE 13

|  | O | P | Q | R | S |
|---|---|---|---|---|---|
| G', unactivated peroxide | 169 | 174 | 185 | 195 | 218 |
| G', activated peroxide | 12 | 12 | 16 | 16 | 19 |

From Table 13 it can be seen that addition of the hollow glass microspheres had a relatively minor effect on the reported G' of the respective Samples where the organoperoxide was unactivated, although the G' value did increase to correspond to the increase in loading of the hollow glass spheres.

While the addition of 4 phr of the hollow glass microspheres had little or no effect upon the G' (Sample P) where the peroxide was activated, it can, however, be seen from Table 13 that the addition of the hollow glass microspheres in an amount of 8 phr and above had a significant effect upon the G' of the respective Samples. For such Samples, as the loading of the hollow glass microspheres increased, the G' of the respective Samples P through S also increased from a value of 12 to 19 kPa to correspond, in general, to increasing addition of the hollow glass microspheres of 8 to 20 phr. This is considered herein to be significant because it is envisioned that use of the extremely small diameter (average diameter of 30 microns) hollow glass microspheres aids in the puncture sealing efficiency and capability of the built-in sealant and at the relatively low concentration levels does not significantly adversely affect the processability of the sealant pre-cursor composition. Further, its envisioned that a high isotactic crush strength of the hollow glass microspheres aids in preserving their hollow microsphere structure during a relatively high shear mixing there of with the butyl rubber during the processing of the sealant pre-cursor composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a built-in puncture sealing layer wherein said puncture sealing layer contains an at least partially organoperoxide-depolymerized butyl rubber-based sealant layer positioned between a sulfur vulcanized halobutyl rubber tire innerliner and a sulfur vulcanized diene-based vulcanized conjugated diene-based tire carcass, wherein said sealant layer is a polymeric composition having a storage modulus (G') in a range of from about 5 to about 50, alternately about 5 to about 30, kPa, which is exclusive of polyisobutylene additive, and is comprised of, based upon parts by weight per 100 parts by weight of said partially depolymerized butyl rubber:
   (A) a partially organoperoxide-depolymerized butyl rubber as a copolymer of isobutylene and isoprene, wherein said copolymer prior to such depolymerization contains from about 0.5 to about 5 percent units derived from isoprene, and correspondingly from about 95 to about 99.5 weight percent units derived from isobutylene, and, based upon parts by weight per 100 parts by weight partially depolymerized butyl rubber (phr) of:
   (B) particulate filler comprised of about 5 to about 90 phr of rubber reinforcing carbon black and coal dust, and, optionally at least one of:
       (1) from zero to about 6 phr of short fibers, and
       (2) from zero to about 20 phr of hollow glass microspheres;
   (C) from zero to about 20 phr of rubber processing oil having a maximum aromatic content of about 15 weight percent;
   (D) from 1 to about 10 phr of liquid polyisoprene having a weight average molecular weight in a range of from about 35,000 to about 65,000.

2. The tire of claim 1 wherein said particulate filler is additionally comprised of from about 0.5 to about 5 phr of short fibers selected from at least one of cotton fibers and synthetic fibers selected from at least one of rayon, aramid, nylon and polyester fibers, and their mixtures, wherein said cotton fibers have an average length of up to about 200 microns and said synthetic fibers have an average length of up to about 2,500 microns.

3. The tire of claim 1 wherein said particulate filler is additionally comprised of from about 5 to about 15 phr of hollow glass microspheres having an average diameter in a range of from about 20 to about 40 microns.

4. The tire of claim 1 wherein said partially depolymerized butyl rubber contains from about 4 to about 15 phr of said rubber processing oil which is comprised of about a 35 to about 45 weight percent naphthenic content, about a 45 to about 55 weight percent paraffinic content and an aromatic content of less than about 15 weight percent.

5. A pneumatic tire having a puncture sealing ability comprised of an assembly of components comprised of an outer circumferential sulfur curable rubber tread, at least one sulfur curable rubber carcass ply supporting said tread and an inner sulfur curable halobutyl rubber tire innerliner layer, is prepared by:
   (A) positioning a layer of an uncured butyl rubber-based rubber composition, exclusive of sulfur curative, as a sealant layer precursor between said innerliner and rubber carcass, wherein said butyl rubber based composition has a storage modulus G' (80° C.) in a range of from about 100 to about 400 kPa, wherein said sealant precursor butyl rubber composition is comprised of, based upon parts by weight per 100 parts of butyl rubber (phr):
       (1) 100 phr of butyl rubber as a copolymer of isobutylene and isoprene which contains about 0.5 to about 5 mole percent units derived from isoprene and, correspondingly about 95 to about 99.5 mole percent derived from isobutylene, and, based upon parts by weight per 100 parts of said butyl rubber (phr);
       (2) particulate filler comprised of about 5 to about 90 phr of rubber reinforcing carbon black and coal dust, and optionally
           (a) from zero to 6 phr of short fibers, and/or
           (b) from zero to about 20 phr of hollow glass microspheres;
       (3) from zero to about 20 phr of rubber processing oil, having a maximum aromatic content of about 15 weight percent;
       (4) from 1 to about 10 phr of liquid polyisoprene having a weight average molecular weight in a range of from about 35,000 to about 65,000; and
       (5) about 0.5 to about 10 phr of active organoperoxide compound; and
   (B) vulcanizing said tire assembly in a suitable mold at a temperature in a range of from about 150° C. to about 175° C. for a sufficient period of time to partially depolymerize said butyl rubber and thereby form a built-in sealant layer having a storage modulus property G' (80° C.) in a range of from about 5 to about 50 kPa.

6. The tire of claim 5 wherein said organoperoxide is selected from at least one of tertbutyl perbenzoate, dialkylbenzene peroxides, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy) hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane.

7. The tire of claim 5 wherein said organoperoxide is comprised of dicumylperoxide.

8. The tire of claim 5 wherein said filler is additionally comprised of about 0.5 to about 5 phr of short fibers selected from at least one of cotton fibers and synthetic fibers selected from at least one of rayon, aramid, nylon and polyester fibers, and their mixtures, wherein said cotton fibers have an average length of up to about 200 microns and said synthetic fibers have an average length of up to about 2,500 microns.

9. The tire of claim 5 wherein said filler is additionally comprised of from about 5 to about 15 phr of hollow glass microspheres having an average diameter in a range of from about 20 to about 40 microns.

* * * * *